United States Patent
Höller et al.

(10) Patent No.: US 10,962,329 B2
(45) Date of Patent: Mar. 30, 2021

(54) RETICLE AND TELESCOPIC SIGHT EQUIPPED THEREWITH, FIREARM HAVING THE SAME, AND METHOD FOR DISTANCE DETERMINATION USING THE RETICLE

(71) Applicant: Schmidt & Bender GmbH & Co. KG, Biebertal (DE)

(72) Inventors: Jonas Höller, Lich (DE); Michael Holzmann, Neustadt (DE); Jörg Hennemann, Biebertal (DE); Thomas Pehlke, Linden/Leihgestern (BE); Kyle Brown, Hartwell, GA (US)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 334 days.

(21) Appl. No.: 15/869,127

(22) Filed: Jan. 12, 2018

(65) Prior Publication Data

US 2018/0202767 A1    Jul. 19, 2018

(30) Foreign Application Priority Data

Jan. 16, 2017    (DE) .......................... 10 2017 100 720

(51) Int. Cl.

| | |
|---|---|
| *F41G 1/38* | (2006.01) |
| *F41G 3/08* | (2006.01) |
| *G02B 23/14* | (2006.01) |
| *G02B 27/34* | (2006.01) |
| *G02B 27/36* | (2006.01) |

(52) U.S. Cl.
CPC .............. *F41G 1/38* (2013.01); *G02B 23/14* (2013.01); *G02B 27/34* (2013.01); *G02B 27/36* (2013.01); *F41G 3/08* (2013.01)

(58) Field of Classification Search
CPC ..... F41G 1/38; F41G 1/18; F41G 1/30; F41G 1/345; F41G 1/40; F41G 1/44
USPC .......................................................... 33/297
See application file for complete search history.

(56) References Cited

U.S. PATENT DOCUMENTS

| | | | |
|---|---|---|---|
| 3,190,003 A | 6/1965 | O'Brien | |
| 5,920,995 A * | 7/1999 | Sammut | ................... F41G 1/38 42/122 |
| 6,357,158 B1 | 3/2002 | Smith, III | |
| 8,353,454 B2 * | 1/2013 | Sammut | ................... F41G 1/38 235/404 |
| 9,291,810 B1 * | 3/2016 | Ross | ................... G02B 23/145 |

(Continued)

FOREIGN PATENT DOCUMENTS

| | | |
|---|---|---|
| DE | 9409374 | 8/1994 |
| DE | 20 2005 017 276 | 4/2006 |

(Continued)

*Primary Examiner* — Yaritza Guadalupe-McCall
(74) *Attorney, Agent, or Firm* — Clark & Brody LP (57) ABSTRACT

The invention relates to a reticle (1) for a telescopic sight (100), having a non-linear size value scale (10) and further special scales and sighting aids (30) which serve in each case for the determination of a distance to a target object or of the size thereof in order that, ultimately, a shot can be fired precisely at the target object. The invention also relates to the method for determining the distance to the target object (ZO) using the non-linear size value scale, and to telescopic sights and firearms having the reticle according to the invention.

21 Claims, 5 Drawing Sheets

(56) References Cited

U.S. PATENT DOCUMENTS

| | | | |
|---|---|---|---|
| 2005/0021282 A1* | 1/2005 | Sammut | G02B 23/14 702/150 |
| 2005/0229468 A1* | 10/2005 | Zaderey | F41G 1/38 42/122 |
| 2005/0257414 A1* | 11/2005 | Zaderey | F41G 1/38 42/122 |
| 2006/0236586 A1 | 10/2006 | Zaderey | |
| 2006/0260171 A1* | 11/2006 | Cole | G02B 23/145 42/122 |
| 2007/0044364 A1* | 3/2007 | Sammut | F41G 1/473 42/122 |
| 2008/0202011 A1* | 8/2008 | Shepherd | F41G 1/44 42/130 |
| 2009/0205239 A1 | 8/2009 | Smith, III | |
| 2009/0235570 A1* | 9/2009 | Sammut | F41G 3/06 42/122 |
| 2011/0132983 A1* | 6/2011 | Sammut | F41G 1/38 235/404 |
| 2012/0186130 A1* | 7/2012 | Tubb | F41G 1/38 42/122 |
| 2013/0033746 A1 | 2/2013 | Brumfield | |
| 2013/0047485 A1* | 2/2013 | Tubb | F41G 1/38 42/122 |
| 2014/0059915 A1* | 3/2014 | Sammut | F41G 3/00 42/122 |
| 2014/0068993 A1* | 3/2014 | Mikroulis | F41G 3/08 42/122 |
| 2014/0166751 A1* | 6/2014 | Sammut | F41G 3/00 235/404 |
| 2014/0373424 A1 | 12/2014 | Silvers et al. | |
| 2015/0253132 A1* | 9/2015 | Senne | G01C 3/02 356/21 |
| 2015/0362288 A1* | 12/2015 | Sammut | F41G 1/38 235/404 |
| 2017/0102209 A1* | 4/2017 | Byars | F41G 1/393 |
| 2018/0202767 A1* | 7/2018 | Holler | F41G 1/38 |
| 2019/0145734 A1* | 5/2019 | Morell | F41G 1/38 42/122 |
| 2019/0195598 A1* | 6/2019 | Hamilton | F41G 1/473 |
| 2019/0257618 A1* | 8/2019 | Mikroulis | F41G 1/473 |
| 2020/0018566 A1* | 1/2020 | Tubb | F41A 21/44 |
| 2020/0050011 A1* | 2/2020 | Hamilton | F41G 11/00 |
| 2020/0072576 A1* | 3/2020 | Gallery | F41G 1/38 |
| 2020/0193652 A1* | 6/2020 | Hoffman | F41G 1/345 |
| 2020/0217617 A1* | 7/2020 | Chavez | F41G 3/06 |

FOREIGN PATENT DOCUMENTS

| | | |
|---|---|---|
| DE | 10 2014 102 966 | 9/2015 |
| EP | 2 916 097 | 9/2015 |
| WO | 2013/106280 | 7/2013 |

* cited by examiner

RETICLE AND TELESCOPIC SIGHT EQUIPPED THEREWITH, FIREARM HAVING THE SAME, AND METHOD FOR DISTANCE DETERMINATION USING THE RETICLE

The invention relates to a reticle as per the preamble of claim 1, to a reticle as claimed in claim 17, to a reticle as claimed in claim 29, to a telescopic sight having a reticle as claimed in claim 32, to a firearm having a telescopic sight as claimed in claim 34, and to a method for striking a target object with a projectile fired from a firearm as claimed in claim 35.

Firearms are used to fire projectiles at a targeted target object. To assist in the targeting, in 30 particular in the case of relatively great firing distances, telescopic sights are used which are arranged on the firearm.

A telescopic sight is a telescope with a target device integrated into the optics. The target device is referred to as a reticle. The reticle may in this case perform at least one of two principal functions. The first principal function is that of imaging a target point in the optics, also referred to as aiming point. This is aligned or positioned on the target object by the shooter before the projectile is fired using the firearm. In order that the optical position of the target point and the actual point of impact of the projectile correspond, a telescopic sight has adjustment means with which it is possible in particular to perform adaptations on the basis of the firing distance, side wind, munition used, firearm used and the like. In the case of relatively great firing distances, the distance to the target object is of great significance, but is generally unknown. This must be determined by the shooter for the purposes of adjusting the telescopic sight.

For this purpose, so-called mil-dot reticles are common in the prior art. In the case of these, on the vertical and horizontal lines of a crosshair, there is also provided a scale gradation, the unit of which is referred to as MIL. The scale gradation is formed with points, wherein said mil-dot points have a diameter of ¼ mil (1 mil is approximately ¹⁄₁₀₀₀ rad or 3.44 MOA). 1 MIL in the telescopic sight corresponds, in variants with constant magnification, to 10 cm in the case of a distance of 100 m, and the diameter of a mil-dot point corresponds to 2.5 cm. Below, the expressions MIL scale, MIL values and MIL reticle will be used where exclusively the distance between the scale marks is important, but not necessarily the size and form thereof. That is to say, these expressions encompass both variants with mil-dot points and variants without.

The MIL scale gradation and the mil-dot points thus serve as a readable measure of length, with which either a determination of the dimensions of the target object is performed using a known firing distance to the target object, or conversely, the determination of the distance is performed by means of a known or at least estimated dimension of the target object. Alternatively, a reference object in the vicinity of the target object itself may also be used, if dimensions thereof are known more exactly.

Reticles may be arranged in the first or the second image plane of telescopic sights. In telescopic sights with variable magnification and arrangement of the reticle in the second image plane, the sizes correspond to the respective specifications only at a single particular magnification. Normally, in the case of such telescopic sights, ten-times magnification is predefined as the dimensionally accurate magnification.

In the case of telescopic sights with MIL reticle and with the reticle in the first image plane, the reticle is jointly magnified, and the MIL values can be applied at any magnification setting. To determine the size or the distance, the determined MIL value is inserted into the following formula: width/distance (in equal length units)=MIL value/1000. Depending on whether the distance or the width is already known, the formula is rearranged in accordance with the value to be calculated.

A disadvantage of such MIL reticles in the first image plane is that the MIL scale gradation is jointly magnified and is either difficult to read in the case of small magnifications or obstructs parts of the field of view in the case of large magnifications. In general, reading the MIL value is difficult and the conversion is complicated, because it is almost always the case that the calculation involves MIL values and previously known sizes which each have decimal points. The shooter thus loses valuable time in performing the calculation before even being able to adjust the telescopic sight for the purposes of firing. If he or she uses an external calculator for this purpose, he or she also briefly loses sight of the target object.

It is therefore an object of the invention to provide a reticle which permits easy and fast determination of the distance to the target object. The method that the shooter must use to determine the distance should in particular be so easy and reliable to perform that he or she does not lose sight of the target object. Furthermore, it is sought to provide a reticle which obstructs the field of view as little as possible even in the event of a change in magnification. Here, the reticle should be inexpensive and reliable to operate. It is also an object to provide a telescopic sight and a firearm having such a reticle, which fully exploit the advantages of the reticle.

The main features of the invention are specified in the characterizing part of claim 1, and in claims 17, 29, 32, 34 and 35. Claims 2 to 16, 18 to 28, 30 to 31 and 33 specify refinements.

The invention relates to a reticle for a telescopic sight, having a transparent carrier plate on which a size value scale is depicted, wherein the size value scale has a first principal line, which forms a first positioning line for positioning at a first reference point of a target object, wherein read lines for positioning at a second reference point of the target object are arranged parallel to the first principal line, wherein in each case one numerical value is assigned to the read lines, wherein the distance between two adjacently arranged read lines which are each assigned a natural numerical value increases with increasing distance from the first principal line.

The distance should preferably increase with each individual natural numerical value. The size value scale is thus non-linear, because the distance between the natural numerical values changes. It is thereby achieved that several natural numerical values, that is to say numbers without decimal digits, are provided for the shooter. This makes it easier for the numerical value to be converted into a distance. Calculation aids are therefore not needed, and the shooter can keep the target object in sight when performing the calculation. In particular in the case of small object sizes in relation to the size value scale, a greater number of natural numerical values is available to the shooter than is the case for example with a linear MIL scale, in the case of which the reading of a decimal digit is of crucial importance. In the case of large object sizes in relation to the size value scale, this is finally rectified according to the invention by means of the relatively great distances between the read lines with natural numerical value, whereby the burden on the eye is reduced. In this case, small surroundings to the closest numerical value lead in any case only to small errors in the actual shot impact point position in relation to the target point position.

The read lines are preferably arranged under the first principal line. In the case of a position below a horizontal sighting line, which in the case of living entities is typically positioned in the upper region, only small raising and lowering movements are thus necessary in order to be able to position the first aiming line at an upper reference point of the target object.

In an optional embodiment, the first principal line is assigned a first conversion formula, into which the ascertained numerical value read at the second reference point of the target object is intended to be inserted as input variable. In this way, in most usage situations, the shooter can read natural numerical values and insert these into the conversion formula, whereby the calculation task can be performed easily. The first conversion formula should thus be a distance function dependent on the numerical value. The first conversion formula is preferably depicted on the first principal line. The shooter therefore has the first conversion formula in sight without the need to divert his or her view, and can continue to observe the target object. In a specific variant of the invention, the numerical values become smaller with increasing distance of the associated read line from the first principal line. Whenever the target object can still be displayed at a reasonable size to the shooter, in particular by means of a zoom, it is thus possible to perform a calculation with small numerical values, which makes the calculation task easy. Only relatively remote targets necessitate a calculation with relatively large read numerical values, wherein the calculation complexity is kept low owing to the non-constant scaling and the available natural numerical values.

The numerical values are preferably denoted by a hash symbol, in particular by #, wherein the hash symbol preferably precedes the numerical value. The hash symbol is nowadays understood in many sectors as an indication of a numerical specification, such that the shooter also identifies that this is a dimensionless specification.

In an optional embodiment, it is provided that a distance of the reticle from the target object is calculable by means of the first conversion formula in that the ascertained numerical value is intended to be multiplied by a defined first distance and by a known size of the target object between the first reference point and the second reference point. It is thus necessary to perform only multiplications, which are normally easier to perform mentally than divisions. It is also only necessary to perform two of these. The first conversion formula thus preferably reads as follows: $D(W)=W*D1$ (in meters)$*X$ (in meters)$*1$/meter. Here, D1 is the defined first distance and X is the known size of the target object, or alternatively also the size known from estimation. The cancelling out by means of the additional factor 1/meter is necessary in order to establish the correct unit, but is irrelevant for the shooter in practice. For this reason, said unit 1/meter or meter$^{-1}$ can be regarded as the unit of the numerical value in order to arrive at a mathematically correct result.

For a practical and nevertheless simple conversion formula, a variant is expedient in which the defined first distance is 100 m and the known size (X) should be inserted in meters. In this way, one of the two required multiplications, specifically that by 100 meters, can be performed mentally particularly easily.

In accordance with one dimensioning of the size value scale, it is provided that the smallest determinable numerical value, which is based on the distance between the first principal line and the read line arranged furthest remote, corresponds to at most 20 MIL, preferably at most 15 MIL and particularly preferably at most 10 MIL of a MIL reticle. In this way, the size value scale is dimensioned such that the target object can be seen at an adequately large size, but a sufficiently large environment around the target object can still be observed. Also practical is an optional limitation of the scaling in the case of which the largest determinable numerical value, which is based on the distance between the first principal line and the read line situated closest, corresponds to a value between 0.3 MIL and 0.9 MIL, preferably between 0.4 MIL and 0.8 MIL and particularly preferably between 0.5 MIL and 0.7 MIL of a MIL reticle. Otherwise, the adjacent read lines lie close together to still permit a precise read.

In theory, it would be possible for the reticle to be positioned in the telescopic sight such that the orientation of the first principal line and of the read lines perpendicular to the connecting line between the first and second reference points can be set by rotation. In practice, the known sizes of target objects are however almost always vertical dimensions or heights. For these usage situations, a horizontal orientation of the first principal line and of the read lines is sufficient.

In order that a numerical value for an easy conversion can be provided even in the case of known horizontal dimensions, an optional supplementation may be expedient in the case of which the size value scale has a second principal line which is oriented perpendicular to the first principal line, wherein the read lines are arranged along the second principal line, the second principal line forming a second positioning line for positioning at a third reference point of the target object, and the read lines extending away from the second principal line, and the respective free end of the read lines forming a read point for positioning at a fourth reference point of the target object. The length of the read line, which is taken into consideration by the numerical value, then corresponds substantially to the distance between the third and fourth reference points of the target object. The shooter will then, by raising or lowering the firearm or the telescopic sight, position the read lines between the third and fourth reference points, in order to choose that whose length corresponds most closely to the distance between the third and fourth reference points.

For a clear visual gradation of the size valve scale, the second principal line is preferably arranged only on one side of the first principal line, specifically in particular on the side on which the read lines are also situated. The size valve scale is particularly self-explanatory if the first and second principal line form a T-shaped intersection.

The numerical values preferably become smaller with increasing distance of the associated read point from the second principal line. In the case of a sensible firing distance with a target object that can be displayed at an adequately large size, the small numerical values permit an easy calculation.

In order that the target object and thus also the reference points thereof are obscured as little as possible, a line configuration is expedient in the case of which the read point is formed directly by a free line end of the read line. Alternatively, the read lines may however also be formed with a geometric line termination at the free line end, in particular with a point, a horizontal mark or an arrow tip.

According to one special design of the size valve scale, the distance between the second principal line and the read point of a read line Increases with Increasing distance of the read line from the first principal line. In this way, the shooter can, by means of a raising or lowering movement, equalize the lengths of the read lines sequentially with the third and fourth reference points. In the case of a positioning below a horizontal sighting line, wherein the read lines are arranged below the first aiming line, it is furthermore the case that, at a high zoom factor, the small numerical values that cannot be used fall outside the field of view, and the read lines situated close together with relatively large numerical values can be clearly differentiated using one's eye owing to the great enlargement of the size valve scale.

In one design variant of the size valve scale, all read points of the read lines which extend away from the second principal line in the same direction are arranged on an (Imaginary) straight line. If read lines are arranged on two sides of the second principal line, there are thus two such imaginary straight lines across the read points. This is visually appealing and easy for the eye to process.

It is furthermore optionally provided that the second principal line is assigned a second conversion formula into which the ascertained numerical value read at the fourth reference point of the target object is intended to be inserted as input variable. In this way, the shooter can, in most usage situations, read natural numerical values and insert these into the second conversion formula, whereby the calculation task can be performed easily. The second conversion formula should thus be a distance function dependent on the numerical value. The second conversion formula is preferably depicted on the second principal line. The shooter therefore has the second conversion formula in sight, without having to divert his or her view. Furthermore, the second conversion formula can be seen as belonging to the second principal line that is used.

In a special variant, a distance of the reticle from the target object is calculable by means of the second conversion formula in that the ascertained numerical value is intended to be multiplied by a defined second distance and by a known size of the target object between the third and fourth reference points. Two multiplications can be easily performed mentally, in particular using natural numerical values. The second conversion formula thus preferably reads as follows: D (W, Y)=W*D2 (in meters)*Y (in meters)*1/meter. Here, D2 is the defined second distance and Y is the previously known size, or at least the size known approximately by estimation, of the target object between the third and fourth reference point.

In order that the shooter does not inadvertently use incorrectly defined distances, it is expedient for the size valve scale to be constructed such that the defined first distance corresponds to the defined second distance. In military use, the target objects are however normally taller than they are wide. For this situation, it is expedient for the defined second distance to be set as being half of the defined first distance.

Furthermore, the mental calculation can be performed particularly easily if the defined second distance is 100 m or 200 m and the known size should be inserted in meters.

Practical dimensioning of the size valve scale is realized in a refinement in which the numerical value based on the distance between the second principal line and the read point arranged furthest remote corresponds to at most 10 MIL, preferably at most 7 MIL and particularly preferably at most 5 MIL of a MIL reticle.

To avoid excessively high line density, which is difficult for the eye to grasp, an optional refinement is expedient in which, at least in one case, the middle read line of three adjacent read lines extends away from the second principal line in the opposite direction to the two outer read lines of the three adjacent read lines.

A variant is particularly preferable in which those read lines which are arranged relatively close to the first principal line extend away from the second principal line alternately in opposite directions. Here, it is specifically the case that the read lines lie closer together, and can be better grasped by the eye in the case of an alternating orientation.

It has furthermore proven to be user-friendly if those read lines which are arranged further remote from the first principal line extend away from the second principal line in the same direction. In this way, the shooter finds the numerical value to be determined in this region with particularly few movements of the reticle over the target object.

A size valve scale which is self-explanatory owing to a low information density can optionally be achieved in that the distance between the second principal line and the respective read point of one of the read lines is assigned the same numerical value as the distance between the first principal line and said read line.

For usage situations in which primarily the height of the target objects is already known, a refinement is expedient in which the first principal line is oriented horizontally and the second principal line is oriented vertically. Alternatively, in usage situations in which rather the horizontal extent (width/length) of the target objects is known, for example in the case of vehicles, it may also be provided that the first principal line is oriented vertically and the second principal line is oriented horizontally.

In order that the shooter can grasp the numerical values assigned to the read lines, it is provided in one embodiment that the numerical values are depicted on at least two of the read lines. An appealing, space-efficient arrangement is obtained in particular if the numerical value is depicted in each case at the free end of the read lines. It is preferable for numerical values to be depicted only on read lines which are assigned a natural numerical value. If expedient, read lines with non-natural numerical values should be omitted. Owing to the large distances between two read lines with natural numerical value at one end of the size scale, it is however additionally expedient if at least two read lines are assigned non-natural numerical values. An optional refinement is particularly self-explanatory in which the read lines which are assigned non-natural numerical value are assigned the half of a natural numerical value. This may optionally be graphically distinguished by virtue of the read lines which are assigned a natural numerical value being depicted by a solid line. The read lines which are assigned non-natural numerical value may by contrast optionally be depicted by a dashed line.

It may optionally furthermore be provided that illumination means are provided by which at least parts of the size valve scale can be illuminated. In this way, the determination of the numerical value can be performed quickly even in poor light conditions. If the telescopic sight has further illuminated components, then the illumination means for the size valve scale are preferably activatable individually. In this way, they can be deactivated again after the distance determination, which normally has to be performed only once.

The invention also relates to a reticle for a telescopic sight, having a transparent carrier plate on which a sighting aid is depicted, the sighting aid having a horizontal sighting axis and a vertical sighting axis which, at their intersection point, define a target point and which divide the transparent carrier plate into four quadrants.

The vertical sighting axis preferably intersects the horizontal sighting axis in the horizontal center of the sighting aid. In this way, it is possible for regions of equal size to be kept in view to the left and to the right of the target point.

It is furthermore preferable if the horizontal sighting axis intersects the vertical sighting axis in the vertical center of the sighting aid. In this way, the point of intersection tends to lie rather in the region of the optical axis of a telescopic sight. Here, the image quality is normally at its highest, such that the use of this region in the targeting of the target object leads to maximum certainty of impact.

In a special embodiment of the reticle, it is provided that a section of the vertical sighting axis situated above the horizontal sighting axis is shorter than a section situated below the horizontal sighting axis. In this way, the upper field of view can be kept free in order that the target object can be viewed more clearly. Furthermore, the vertically lower section of the vertical sighting axis can be utilized as an aiming line, in particular if the adjustment travel of the telescopic sight is not sufficient. For this purpose, the user may utilize a scale mark of a lower vertical scale as an aiming point rather than the point of intersection. An embodiment is particularly practical in which a section of the vertical sighting axis situated above the horizontal sighting axis ends further remote from an edge of the transparent carrier plate than a section situated below the horizontal sighting axis, and preferably also further remote than the ends of the horizontal sighting axis.

For an arrangement of the carrier plate in a tubular housing of a telescopic sight, a carrier plate with a circular (circumferential) edge is particularly expedient.

By means of the vertical and horizontal sighting axes, it can be defined that the first quadrant is an upper left quadrant, the second quadrant is an upper right quadrant, the third quadrant is a lower left quadrant and the fourth quadrant is a lower right quadrant.

It is optionally provided that the horizontal sighting axis and/or the vertical sighting axis bear(s) MIL scale marks of a MIL scale. In this way, a determination of a distance or determination of a size of the target object can be performed. To be able to perform an adequately precise determination, it is advantageous for a scale gradation with non-natural MIL interim values to be provided. To provide the finest possible readable division, it is optionally provided that the non-natural even and odd MIL interim values between at least two natural MIL values extend away from the horizontal sighting axis in opposite directions. These are preferably 0.1 MIL interim values.

In the case of the reticle being used in the first image plane of a telescopic sight with variable magnification, regions of different size of the sighting aid are utilized. To assist the human eye in the case of the different magnifications, it is provided in one embodiment that the MIL scale marks have a greater mark thickness, and/or are longer, and/or are arranged at greater distances from one another, in stepwise fashion with increasing distance from the target point.

In a further embodiment, the mark thickness of the horizontal sighting axis and/or of the vertical sighting axis increases in stepwise fashion with increasing distance from the target point.

The human eye is also assisted with an embodiment in which the horizontal sighting axis is, at a distance from the target point, formed as a double line. Said horizontal sighting axis should, by contrast, be formed as a single line in the center around the target point. A double line furthermore obscures less of the surroundings of the target object.

In a special variant, the two lines of the double line conically diverge with increasing distance from the target point. Therefore, in the outer region of the reticle, despite increasing mark thickness, only little of the surroundings of the target object is obscured. A refinement is expedient in which the double line starts at a full MIL value which lies preferably between 3 and 7 MIL, more preferably between 4 and 6 MIL and is particularly preferably 5 MIL. The single line thus then lies in the region utilized in the targeting, and the outer region with the double line draws the eye to said single line and to the target point.

In order to obstruct as little as possible of the targeted impact point position on the target object, a refinement is advantageous in which the horizontal sighting axis and/or the vertical sighting axis are formed, in the region around the target point, by a dashed line. It is expedient here for the lengths of the line sections and of the line interruptions of the dashed line to be selected such that they form or replace the MIL scale in the region around the target point. In other words, said line sections and line interruptions take the place here of MIL scale marks that would otherwise be arranged perpendicular to the dashed line.

It is furthermore optionally provided that the reticle has an illumination means by which the horizontal sighting axis and/or the vertical sighting axis can be illuminated in the region around the target point. This permits use with little burden on the eye even in poor vision conditions. Adaptation is possible if at least two illumination intensities can be set.

In a particular embodiment, parts of the sighting aid and/or of the size value scale are formed with chromium structures, which illuminate in the presence of an associated and activated Illumination means and which preferably exhibit increased opacity in the absence of activated illumination means. In this way, the chromium structures are visible even without activated illumination means. Here, the Illumination means Illuminate the chromium structure preferably from one side, and can thus be supplied with electrical energy relatively easily.

What Is particularly advantageous Is optional dimensioning such that the illuminated regions around the target point are formed as structures which have a mark thickness of at most 4 μm. In this way, the target object is scarcely obstructed by said structures even at large magnifications of the reticle.

A further optional enhancement for the distance and/or object size determination may consist in that a raster is formed at a distance from the target point on the horizontal sighting axis, wherein MIL scale marks situated within the raster are visually lengthened in that in each case one point is depicted, in the axis of elongation of the MIL scale mark, at the outer edge of the raster. With the raster, the MIL values for the height and the width of a target object can be ascertained simultaneously. The raster is preferably 1 MIL wide and 1 MIL tall. The raster poses the least obstruction, and nevertheless lies in the field of view of the reticle even at relatively high magnification, if it is arranged between 4 MIL and 5 MIL of the MIL scale.

For the provision of marks for a particularly fine gradation of the MIL values, it may be provided that, within the raster, half values between MIL scale marks are depicted by vertically oriented interrupted lines which extend in each case as far as the outer edge of the raster.

The line sections and the line interruptions of the interrupted lines optionally correspond to MIL values. In this way, the MIL values are particularly easy to determine, wherein the interrupted lines obstruct the target object only to a small extent.

A particularly advantageous embodiment is a punctiform configuration of the line sections, whereby a point raster is formed. Here, each punctiform line section (point) should be assigned a horizontal and a vertical MIL value.

In one variant, a vertical MIL scale is depicted at a horizontal end of the raster, preferably at the outer end of the raster, which vertical MIL scale corresponds to the line sections and the line interruptions of the interrupted lines.

It may furthermore be provided that a second raster is depicted which is of mirror-symmetrical form with respect to the raster on the opposite side of the vertical sighting axis. In this way, the shooter can decide which side of the surroundings of the target object should be observed during the MIL value determination, and which is disregarded as a result of the pivoting of the telescopic sight.

In order that no operating instructions have to be carried along and the calculation formulae are always available, a MIL distance formula and/or a MIL target object size formula may be depicted at the lower end of the sighting aid.

The MIL distance formula reads as follows:

Distance in meters ($E$)=known target object size in meters ($X,Y$)/read MIL value×1000 m The MIL target object size formula reads as follows:

Target object size in meters ($X,Y$)=known distance in meters ($E$)×read MIL value/1000 m It is self-evident that the designations of the calculation variables may also be selected differently, in particular in other languages or using analogous expressions and abbreviations.

The invention also relates to a reticle in which the size value scale is arranged, preferably entirely, in one of the four quadrants of the sighting aid. In this way, the size value scale and the sighting aid can share the carrier plate. With this combination, fast and easy determination of the distance is made possible for the shooter by means of the size value scale. By contrast, during the subsequent target acquisition using the sighting aid, the shooter is scarcely impaired by the size valve scale.

An embodiment is particularly expedient in which the size valve scale is arranged below the horizontal sighting axis. In this way, the upper field of view is kept free. In a special variant, the size value scale is arranged in that quadrant of the sighting aid which is arranged to the left of the vertical sighting axis and below the horizontal sighting axis. This position is more ergonomic in terms of the handling of the firearm in particular for right-handed persons.

In a preferred refinement, the size value scale is situated entirely in a region around the target point, which region extends vertically from 0 MIL to ±10 MIL and horizontally from 0 MIL to ±10 MIL, preferably 0 MIL to ±8 MIL, of an optionally depicted MIL scale. The size valve scale thus lies in that region of the reticle which remains visible in the case of relatively great firing distances despite the zoom, and in which precise ascertainment of the numerical value suited to the target object is possible.

In a special embodiment, the first principal line is arranged exactly 2.0 MIL from the horizontal sighting axis. Optionally, the first principal line may also end exactly 2.0 MIL from the vertical sighting axis. The inner 2 MIL around the target point are thus kept free from obstructive symbols. So as not to disrupt the utilization of the sighting aid, it should also be the case that none of the read lines extend closer than 2.0 MIL to the vertical sighting axis.

It is preferable if, in one of the other quadrants, zoom factors are depicted along an (imaginary) straight line, preferably a diagonal with a point of intersection with the target point, wherein a set zoom of a telescopic sight can be determined by reading the outermost visible zoom factor. The set zoom for acquiring the target object is, for the shooter, a first good indicator of the firing distance. The zoom factors are preferably depicted in the quadrant which is arranged to the right of the vertical sighting axis and below the horizontal sighting axis. In this way, too, the upper field of view is kept free.

The invention also relates to a telescopic sight having a housing in which an objective and a reticle as described above and below are arranged along an optical beam path. The advantages of the telescopic sight correspond to those of the various possible refinements of the reticle. In particular, easy target distance determination and the most precise possible target acquisition are made possible.

In a special embodiment, the telescopic sight has a first image plane behind the objective along the beam path, the reticle being arranged in the first image plane. Thus, the reticle preferably lies in the focus of the objective and is magnified if the telescopic sight has a variable zoom.

Optionally, the telescopic sight may have a lens arrangement behind the first image plane along the beam path, and a second image plane behind the lens arrangement along the beam path. Said lens arrangement serves for displaying the image in the first image plane in magnified form in the second image plane, and furthermore for turning the image upright. For this purpose, the lens arrangement forms a so-called inverting system.

The reticle is particularly suitable for telescopic sights which have an adjustable optical magnification or an optical zoom. The inverting system provided for this purpose preferably has, for this purpose, two lens units which are arranged so as to be individually displaceable along the beam path between the first and second image planes. Easy adjustment of the zoom is possible if the individual displacements of the two lens units are kinematically coupled such that a position of one of the lens units is dependent on the position of the other of the lens units.

The telescopic sight should furthermore have a holder for attachment in a fixed, predetermined position relative to a barrel of a firearm.

In the housing there is preferably arranged an ocular, wherein preferably the objective is arranged at a first end, and the ocular is arranged at a second end, of the housing.

Furthermore, high-zoom telescopic sights generally have a so-called diverging lens in front of the ocular and behind the inverting system. This yields a closed targeting arrangement. In modifications, image amplifiers may also be arranged behind the second image plane. This also permits night vision.

The invention furthermore relates to a firearm having a telescopic sight as described above and below. With such a firearm, a target object can be acquired, the target object can be precisely measured and targeted using the reticle, the target point position can be aligned, preferably by adjustment of the telescopic sight, and a shot can be fired precisely at the target object. The telescopic sight should be mounted on the firearm, in particular in bullet-proof fashion. In detail, the telescopic sight should be fastened in a fixed, predetermined position relative to a barrel of the firearm.

The invention also relates to a method for striking a target object of known or estimable size with a projectile fired from a firearm as described above and below, comprising the following steps:

localizing the target object of known or estimable actual size;

determining the distance to the target object by positioning the size value scale on the target object, in particular on reference points of the target object, reading the numerical value from the size value scale and converting the numerical value into the distance;

adjusting the telescopic sight on the basis of the determined distance;

aligning the target point on the target object; and firing the projectile from the firearm.

In this way, the target object is struck easily, quickly and reliably by the projectile. The adjustment of the telescopic sight may also be performed taking into consideration side wind and/or vertical air streams. Furthermore, the adjustment of the telescopic sight may be performed taking into consideration the relevant parameters of the firearm used and/or of the munition used.

Further features, details and advantages of the invention will emerge from the wording of the claims and from the following description of exemplary embodiments on the basis of the drawings, in which:

Figure 1:
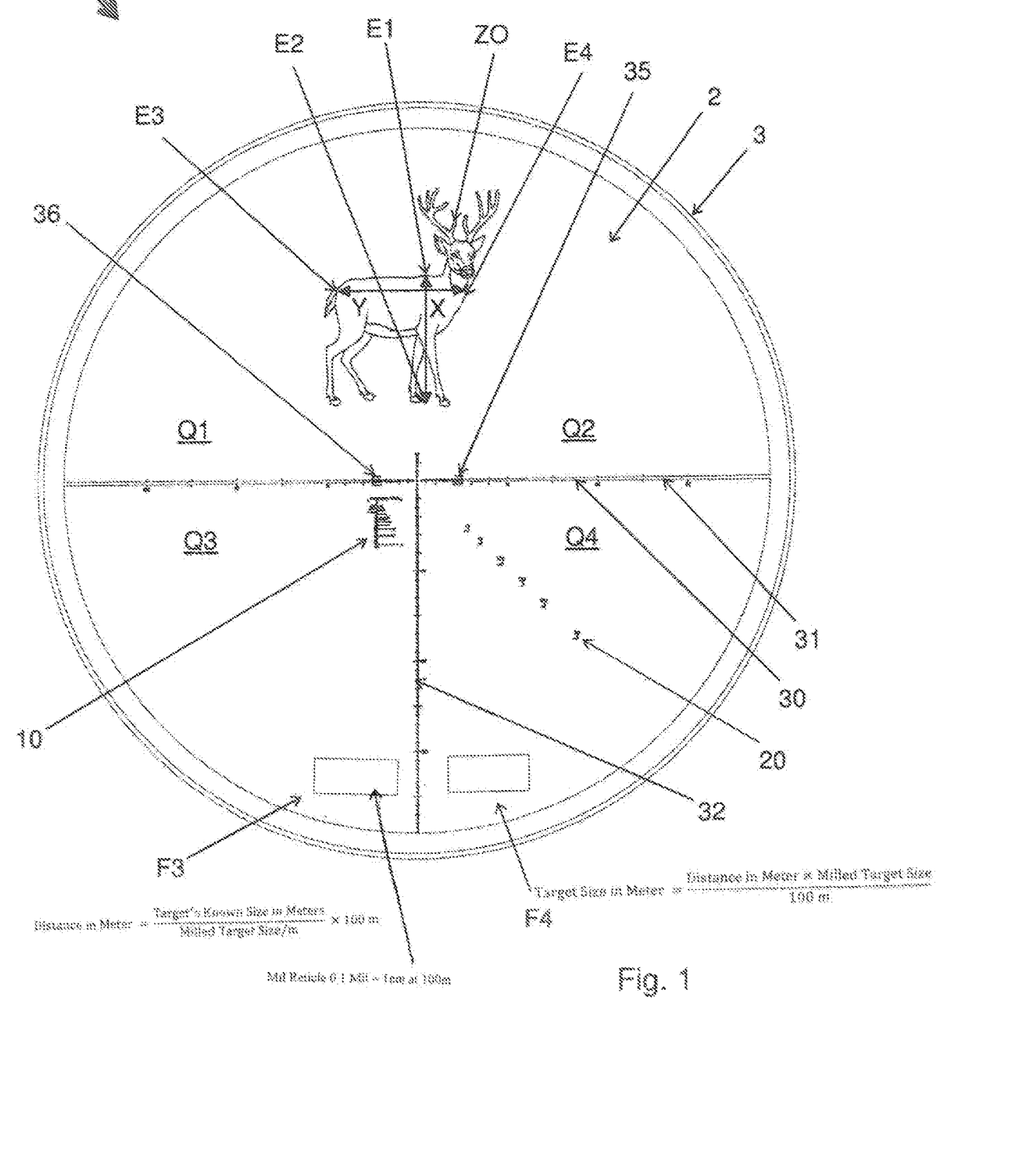
FIG. 1 shows a reticle, with the carrier plate being depicted up to its edge.

FIG. 1 shows a reticle 1 for a telescopic sight. The reticle 1 has a transparent carrier plate 2, on which various graphical elements are arranged. The carrier plate 2 has an edge 3, which in the present case is of circular form. Furthermore, the carrier plate 2 is preferably of planar form at least on the side on which the graphical elements are arranged. The carrier plate 2 is particularly preferably a flat planar plate.

As graphical elements, it is possible to see a size value scale 10 depicted on the carrier plate 2, a sighting aid 30, zoom factors 20 and a MIL distance formula F3 and a MIL target object size formula F4.

The sighting aid 30 has a horizontal sighting axis 31 and a vertical sighting axis 32, which at their point of intersection define a target point (see reference designation 33 in FIG. 2) and which divide the transparent carrier plate 2 into four quadrants Q1, Q2, Q3, Q4. The vertical sighting axis 32 and the horizontal sighting axis 31 intersect at the horizontal and vertical center of the sighting aid 30 or of the carrier plate 2. The first quadrant Q1 is an upper left quadrant, the second quadrant Q2 is an upper right quadrant Q2, the third quadrant Q3 Is a lower left quadrant and the fourth quadrant Q4 is a lower right quadrant.

It can be seen that a section of the vertical sighting axis 32 situated above the horizontal sighting axis 31 is shorter than a section situated below the horizontal sighting axis 31. The section of the vertical sighting axis 32 situated above the horizontal sighting axis 31 thus ends further remote from the edge 3 of the transparent carrier plate 2 than the section situated below the horizontal sighting axis 31. Because the horizontal sighting axis 31 also extends as far as the edge region of the carrier plate 2, the section of the vertical sighting axis 32 situated above the horizontal sighting axis 31 also ends further remote from the edge 3 than the ends of the horizontal sighting axis 31. In this way, the upper field of view is kept free in order that a target object ZO Illustrated by way of example can be more clearly seen.

A ring-shaped structure can be seen at the circumference and thus at the edge 3 of the carrier plate. Said region serves in particular for holding the carrier plate 2 in an enclosure. To avoid light scatter, said edge region may have an opaque coating or may be roughened.

The vertically lower section of the vertical sighting axis 32 may, in the case of large firing distances, be utilized as an aiming line, in particular if the adjustment travel of the telescopic sight is not sufficient. For this purpose, the user may utilize a scale mark of a lower vertical scale on the vertical sighting axis 32 as a substitute aiming point.

The MIL distance formula F3 and the MIL target object size formula F4 are depicted to the left and to the right of the vertical sighting axis 32 at the lower end of the sighting aid 30 and at the lower edge 3 of the carrier plate 2.

The MIL distance formula F3 logically reads:

$$\text{Distance in meters} = \frac{\text{known target object size in meters}}{\frac{\text{read MIL value}}{\text{meter}}} \times 100 \text{ m}$$

For an internationally uniform configuration of the reticle 1, however, a preferred actual wording for the MIL distance formula F3 is one which reads:

$$\text{Distance in Meter} = \frac{\text{Target's Known Size in Meters}}{\text{Milled Target Size/m}} \times 100 \text{ m}$$

The MIL target object size formula F4 logically reads:

Target object size in meters =

$$\frac{\text{known distance in meters } (X, Y) \times \text{read } MIL \text{ value}}{100 \text{ m}}$$

For an internationally uniform configuration of the reticle 1, however, a preferred wording for the MIL target object size formula F4 is one which reads:

$$\text{Target Size in Meter} = \frac{\text{Distance in Meter} \times \text{Milled Target Size}}{100 \text{ m}}$$

A scale measure for assisting the shooter is furthermore stated at the lower edge of the reticle 1, which scale measure reads as follows:

Mil Reticle 0.1 Mil=1 cm at 100 m

From this, it thus emerges that a MIL value of 0.1 MIL in the case of a distance of 100 m corresponds to a size of the target object of exactly 1 cm.

Thus, in the case of the illustrated target object ZO, a deer, of which the shoulder height X between the first and second reference point E1, E2 is known as being 1.2 meters, but the body length Y between the third and fourth reference point E3, E4 is not known, it would emerge, for the distance calculation, that the vertical MIL value between the first and second reference point E1, E2 amounts to 13.5 MIL. This results in a distance to the target object ZO of 88.9 meters.

Figure 4:
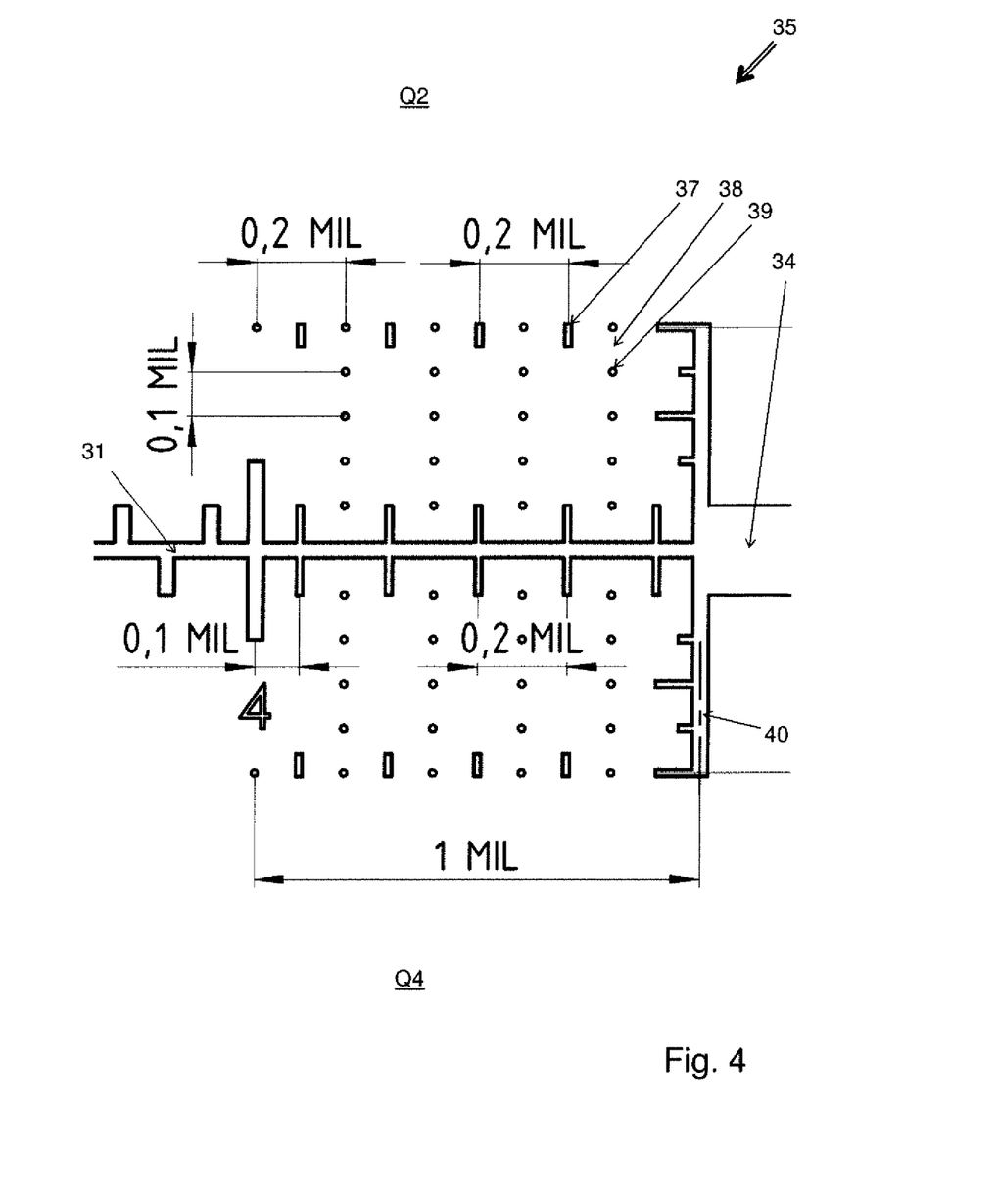
FIG. 4 shows an enlarged view of the raster shown in FIG. 1 on the horizontal sighting axis.

Furthermore, spaced apart from the target point to the left and to the right on the horizontal sighting axis 31 is in each case one raster 35, 36, the details of which can be seen from FIG. 4 and the associated description.

In the quadrant Q4, which is arranged to the right of the vertical sighting axis 32 and below the horizontal sighting axis 31, the zoom factors 20 are depicted along an (imaginary) straight line which is a diagonal with a point of Intersection with the target point 33. A set zoom of a telescopic sight can then be determined by reading the outermost visible zoom factor 20.

Figure 2:
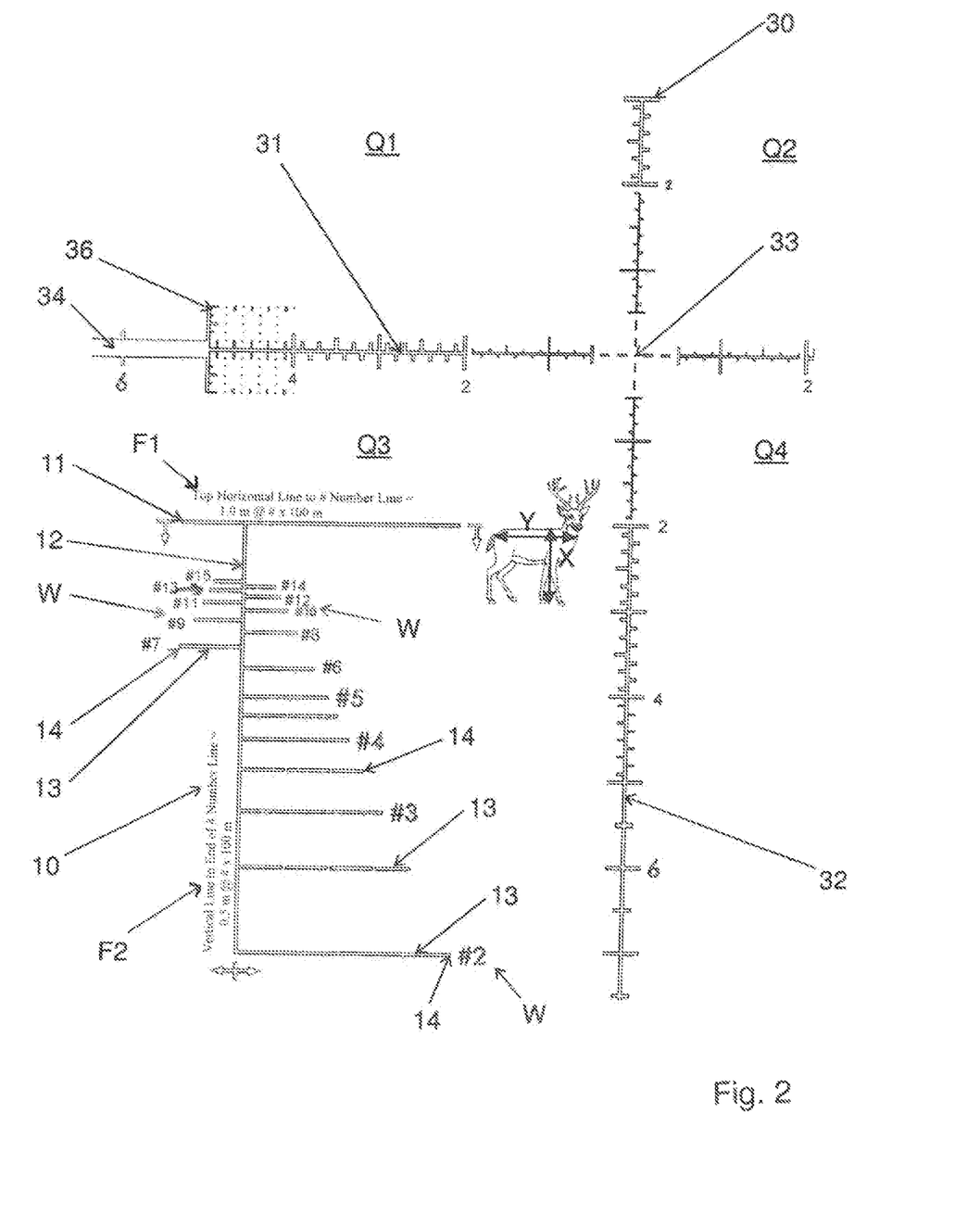
FIG. 2 shows a detail from the center of the reticle as per FIG. 1.

FIG. 2 shows a detail from the center of the reticle 1 as per FIG. 1. The same reference designations are therefore used to denote the same technical features as in FIG. 1, for which reason reference is made to the associated description above.

In addition to the target point 33 denoted in FIG. 2 at the point of intersection of the horizontal and vertical sighting axes 31, 32, it is possible here to much more clearly see the raster 36. It can also be seen how the horizontal sighting axis 31 is, at a distance from the target point 33, formed as a double line 34. Viewing the outer region of the horizontal sighting axis 31 in FIG. 1, it can be seen how the two lines 34 moderately conically diverge with increasing distance from the target point 33. As per FIG. 2, the double line 34 begins directly behind the raster 36 and at the MIL value 5.0.

It can also be seen that the horizontal and vertical sighting axes 31, 32 are formed in each case by a dashed line in the region around the target point 33. The dashed line adjoins, at 0.5 MIL, a solid line. The lengths of the line sections and of the line interruptions of the dashed line form the MIL scale in the region around the target point 33. For this purpose, the line interruptions and the line sections are in each case 0.1 MIL in length. In other words, here, the line sections and line interruptions take the place of the MIL scale marks used further to the outside, which are arranged perpendicular to the dashed line.

The reticle 1 has an illumination means by which the horizontal and vertical sighting axes 31, 32 can be illuminated in the region around the target point 33 up to 0.5 MIL. For this purpose, a structure composed of chromium is formed which is Illuminated when the illumination means are activated, and which, in the absence of activated illumination means, remains visible by the fact that it has at least an increased opacity. The structures composed of chromium have a mark thickness of at most 4 μm.

The MIL scale marks on the horizontal and vertical sighting axes 31, 32 have a greater mark thickness in stepwise fashion, are of longer form in stepwise fashion, and are arranged at greater distances from one another, with increasing distance from the target point 33.

Furthermore, the mark thickness of the horizontal sighting axis 31 and of the vertical sighting axis 32 increases in stepwise fashion with increasing distance from the target point 33.

It is pointed out that, in practice, normally all lines and characters of the reticle 1 are solid lines. However, to provide sharp contours, the lines and characters are however illustrated with borderlines. The double line 34 may in this case also be formed as a fully blackened line.

In particular, the mark thicknesses of the axis and of the MIL scale marks in the region of the upper section of the vertical sighting axis 32 change at two step boundaries, specifically from the dashed line in the region of the target point 33, to a solid line and to a thicker line. The step boundaries lie at 0.5 MIL and 2.0 MIL, wherein the upper section of the vertical sighting axis 32 ends at 3.0 MIL. Only the value 2.0 MIL is denoted at the associated scale mark by the numeral 2.

On the lower section of the vertical sighting axis 32, the mark thicknesses of the axis and of the MIL scale marks in the region change at three step boundaries, specifically from the dashed line in the region of the target point 33, to a solid line, to a thicker line with fine MIL interim value gradation and an equally thick line with relatively coarse MIL interim value gradation. The step boundaries lie at 0.5 MIL, 2.0 MIL and 5.0 MIL, wherein the lower section of the vertical sighting axis 32 ends at approximately 39.0 MIL. Only the value 2.0 MIL and the multiples thereof up to 10.0 MIL are denoted by numerals at the respectively associated scale mark. Further to the outside, only the MIL values 20 MIL and 30 MIL are then depicted. The character size also increases in the outward direction proceeding from the target point.

The horizontal sighting axis 31 is of mirror-symmetrical design to the left and to the right of the vertical sighting axis 32. Here, the mark thicknesses of the axis and of the MIL scale marks change at three step boundaries, specifically from the dashed line in the region of the target point 33, to a solid line, to a thicker line with fine MIL interim value gradation, to an equally thick line with the raster (35, see FIG. 1), 36 as MIL gradation, and to the double line 34. The step boundaries lie at 0.5 MIL, 2.0 MIL, 4.0 MIL and 5.0 MIL.

In the region in which the scale gradation is depicted with non-natural MIL interim values (with the exception of the rasters 35, 36), the non-natural even and odd MIL interim values extend in opposite directions away from the sighting axis 31, 32. In this way, the MIL interim values with the 0.1 MIL gradation can be easily read.

Figure 3:
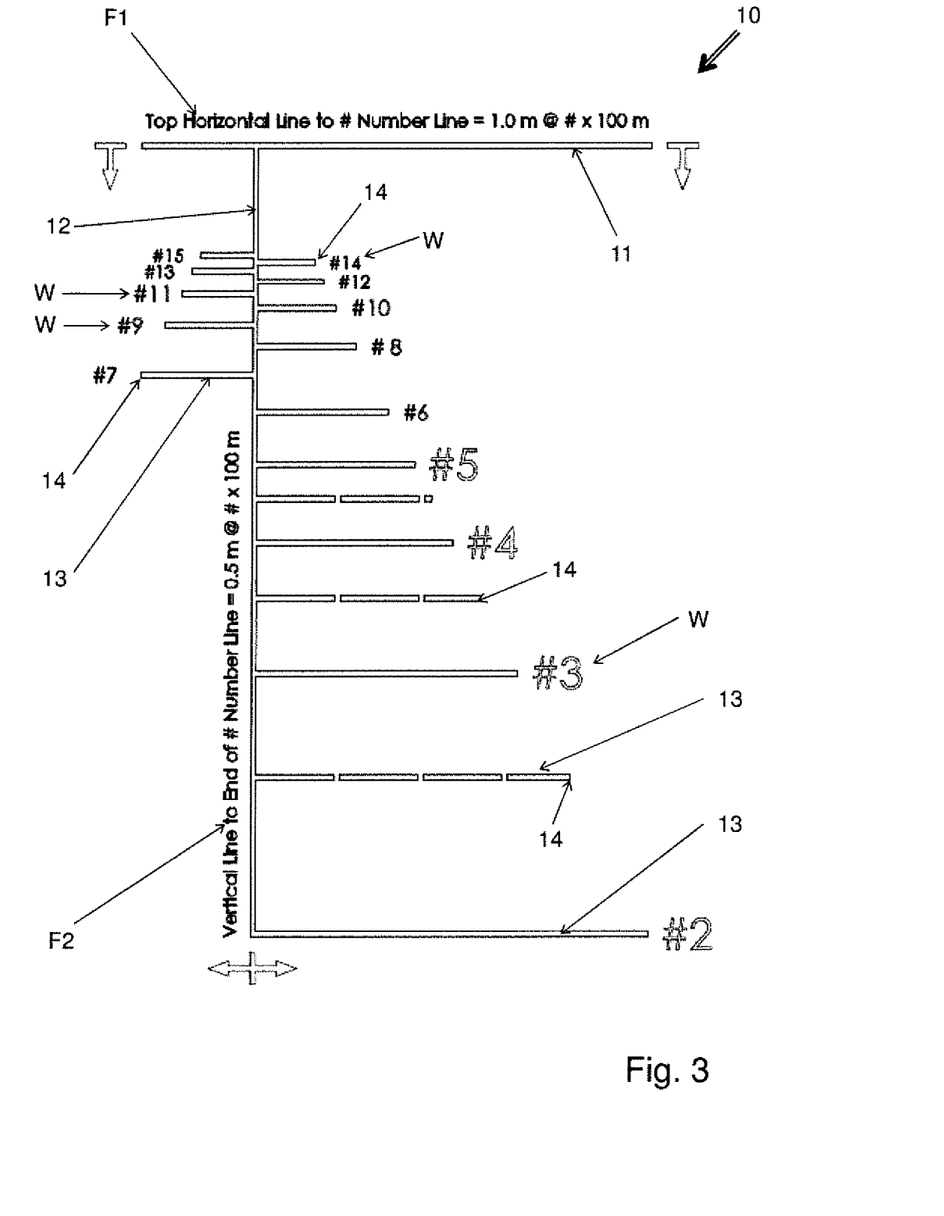
FIG. 3 shows an enlarged view of the size value scale shown in FIGS. 1 and 2.

The size value scale 10 in the left lower quadrant Q3 is illustrated on its own once again in FIG. 3. The description in this regard relating to FIG. 2 therefore also applies analogously to FIG. 3. It can be seen in FIGS. 2 and 3 that the size value scale 10 has a first principal line 11 which forms a first positioning line for positioning at a first reference point E1 of a target object ZO. Arranged parallel to the first principal line 11 are read lines 13 for positioning at a second reference point E2 of the target object ZO. The read lines 13 are assigned in each case one numerical value W. As can be seen, the distance between two adjacently arranged read lines 13 which are each assigned a natural numerical value W increases with increasing distance from the first principal line 11. A non-linear scale gradation is thus provided.

The numerical values W decrease with increasing distance of the associated read line 13 from the first principal line 11. Furthermore, the numerical values W are denoted by a hash symbol, in particular by #, which precedes the numerical value W itself.

The first principal line 11 is assigned a first conversion formula F1, into which the ascertained numerical value W read at the second reference point (see reference designation E2 in FIG. 1) of the target object ZO is intended to be inserted as input variable. The following user instruction yields a simple calculation that can be performed without units:

Top Horizontal Line to #Number Line=1.0 (m)@#× 100 (m)

From this user instruction, it emerges that a target object size of 1.0 m in conjunction with the read numerical value W corresponds to a distance of the numerical value W multiplied by 100 m.

From this, the shooter can derive that the conversion formula F1 is a distance function dependent on the numerical value W, which logically reads:

Distance $(X, W)$=numerical value $W$×target object size in meters $X$×100 m*m$^{-1}$ With the first conversion formula F1, it is thus possible to calculate a distance D of the reticle 1 to the target object ZO in that the ascertained numerical value W is intended to be multiplied by a defined first distance D1 of 100 m and by a known size X of the target object ZO between the first and second reference points (E1, E2).

For the target object ZO depicted by way of example in FIG. 2, again a deer with a shoulder height X of 1.2 m, the size value scale 10 yields a numerical value of #11. The firing distance is thus 1320 m (=11×1.2×100).

For comparison, the MIL scale yields a MIL value for X of 0.9 MIL. This corresponds to a firing distance of 1333 m, which is sufficiently accurate.

The smallest determinable numerical value W #2, which is based on the distance between the first principal line 11 and the read line 13 arranged furthest remote, corresponds to 5 MIL on the MIL scale on the sighting axes 31, 32.

Furthermore, the size value scale 10 has a second principal line 12 which is oriented perpendicular to the first principal line 11. Here, the first principal line 11 is oriented horizontally and the second principal line 12 is oriented vertically. The second principal line 12 is situated only on one side of the first principal line 11, specifically below the latter, wherein the first and second principal lines 11, 12 form a T-shaped intersection. Directional arrows at the ends are used in each case to denote which side of a target object ZO the aiming lines are to be positioned at.

The read lines 13 are arranged along the second principal line 12 and have defined lengths. The second principal line 12 forms a second positioning line for positioning at a third reference point (see reference designation E3 in FIG. 1) of the target object ZO. Furthermore, the read lines 13 extend away from the second principal line 12, and the respective free end of the read lines 13 forms a read point 14 for positioning at a fourth reference point (see reference designation E4 in FIG. 1) of the target object ZO.

The numerical values W decrease with increasing distance of the associated read point 14 from the second principal line 12. In the present case, the read points 14 are formed directly by a free line end of the read line 13. That is to say, no geometrical line terminations such as points, transverse marks or arrow tips are provided on the read lines 13.

The distance between the second principal line 12 and the read point 14 of a read line 13 increases with increasing distance of the read line 13 from the first principal line 11.

By means of this arrangement, it is possible for the distance between the second principal line 12 and the respective read point 14 of one of the read lines 13 to be assigned the same numerical value W as the distance between the first principal line 11 and said read line 13. The numerical values W are depicted on at least two of the read lines 13, specifically in each case at the free ends of the read lines 13. Furthermore, only numerical values W which are assigned a natural numerical value are depicted. Furthermore, three read lines 13 are assigned non-natural numerical values. Instead, said three read lines 13 are assigned in each case the half of a natural numerical value. This special feature is graphically emphasized by virtue of those read lines 13 which are assigned a natural numerical value being depicted by a solid line and those read lines 13 which are assigned a non-natural numerical value being depicted by a dashed line.

Those read lines 13 which are arranged relatively close to the first principal line 11 are situated very close together, for which reason they extend away from the second principal line 12 alternately in opposite directions. By contrast, those read lines 13 which are arranged further remote from the first principal line 11 extend away from the second principal line 12 in the same direction. Here, the boundary lies at the numerical value W #7. The odd numerical values W are, from this point onward, relocated to the left. During the optical comparison with the target object, the shooter will firstly consider the right-hand read lines 13 and, if no value matches, he or she will change over to the left-hand read lines 13 in order to determine the interim value that is missing on the right Upon this change from left to right, the definition of the reference points E3 and E4 on the target object ZO is reversed.

It can be seen that all read points 14 of the read lines 13 extending away from the second principal line 12 in the same direction are arranged on an imaginary straight line. The two imaginary straight lines form a cone, the central axis of which is the second principal line 12.

The second principal line 12 is assigned a second conversion formula F2, into which the ascertained numerical value W read at the fourth reference point E4 of the target object ZO is intended to be inserted as input variable.

The second conversion formula F2 is depicted in the form of an exemplary embodiment on the second principal line 12, and reads:

Vertical Line to End of #Number Line=0.5 m@#× 100 m

From this user instruction, it emerges that a target object size of 0.5 m in conjunction with the read numerical value W corresponds to a distance of the numerical value W multiplied by 200 m.

From this, the shooter can derive that the second conversion formula F2 is a distance function dependent on the numerical value W, which logically reads:

Distance $(Y,W)$=numerical value $W$×target object size in meters $Y$×200 m*m$^{-1}$ With the second conversion formula F2, it is thus possible to calculate the distance of the reticle 1 to the target object ZO in that the ascertained numerical value W is intended to be multiplied by a defined second distance D2 of 200 m and by a known size Y of the target object ZO between the first and second reference points (E1, E2).

For the target object ZO depicted by way of example in FIG. 2, the deer with a body length Y of 1.3 m, the size value scale 10 yields a numerical value of #5. Thus, the firing distance amounts to 1300 m.

For comparison, the MIL scale yields a MIL value for Y of 0.95 MIL. This corresponds to a firing distance of 1368 m, which still lies very close to the value determined above using the size value scale 10. However, if the shooter rounds to the available MIL interim value 0.9 MIL or 1.0 MIL, this leads to a range from 1300 m to 1444 m.

The smallest determinable numerical value W #2, which is based on the distance between the first principal line 11 and the read line 13 arranged furthest remote, corresponds to 2.5 MIL on the MIL scale on the horizontal sighting axis 31.

In the present case, the defined second distance D2 thus does not correspond to the defined first distance D1, but rather is a multiple thereof.

It may optionally be provided that illumination means are provided, by which at least parts of the size value scale 10 can be illuminated.

The size value scale 10 is, as per FIGS. 1 and 2, arranged entirely in the quadrant Q3 of the sighting aid 30, which is arranged to the left of the vertical sighting axis 32 and below the horizontal sighting axis 31. It furthermore lies entirely in a region around the target point 33 which extends vertically from 0 MIL to ±10 MIL and horizontally from 0 MIL to ±10 MIL on the MIL scale.

Here, the first principal line 11 is arranged at a distance of exactly 2.0 MIL from the horizontal sighting axis 31, and ends exactly 2.0 MIL from the vertical sighting axis 32. Also, none of the read lines 13 projects closer than 2.0 MIL to the vertical sighting axis 32.

FIG. 4 illustrates the raster 35 from FIG. 1 on an enlarged scale. It is situated between the MIL values 4.0 MIL and 5.0 MIL. MIL scale marks that lie within the raster 35 are visually lengthened in that in each case one additional point 37 is depicted, in the axis of elongation of the MIL scale mark, at the outer edge of the raster 35. Said point is in the form of a very short dash.

The raster 35 is exactly 1 MIL wide and 1 MIL tall. Here, it lies 0.5 MIL above and 0.5 MIL below the horizontal sighting axis 31, and, at 5.0 MIL, adjoins the double line 34 of the horizontal sighting axis 31.

Within the raster 35, half values between MIL scale marks are depicted by vertically oriented interrupted lines 38, in particular dotted lines, which extend in each case as far as the outer edge of the raster 35. The punctiform line sections 39 and the line interruptions of the interrupted lines correspond to MIL values, whereby a point raster is formed. Each punctiform line section 39 (point) is assigned a horizontal and a vertical MIL value. To illustrate the vertical MIL values, a vertical MIL scale 40 is depicted at the horizontally outer end of the raster 35, which vertical MIL scale corresponds to the line sections and the line interruptions of the Interrupted lines.

The dimensions shown in FIG. 4, which are denoted in the unit MIL, serve merely for explaining the invention, but are not a constituent part of the reticle 1.

The raster 36 as per FIGS. 1 and 2 is formed mirror-symmetrically with respect to the raster 35 on the opposite side of the vertical sighting axis 32.

Figure 5:
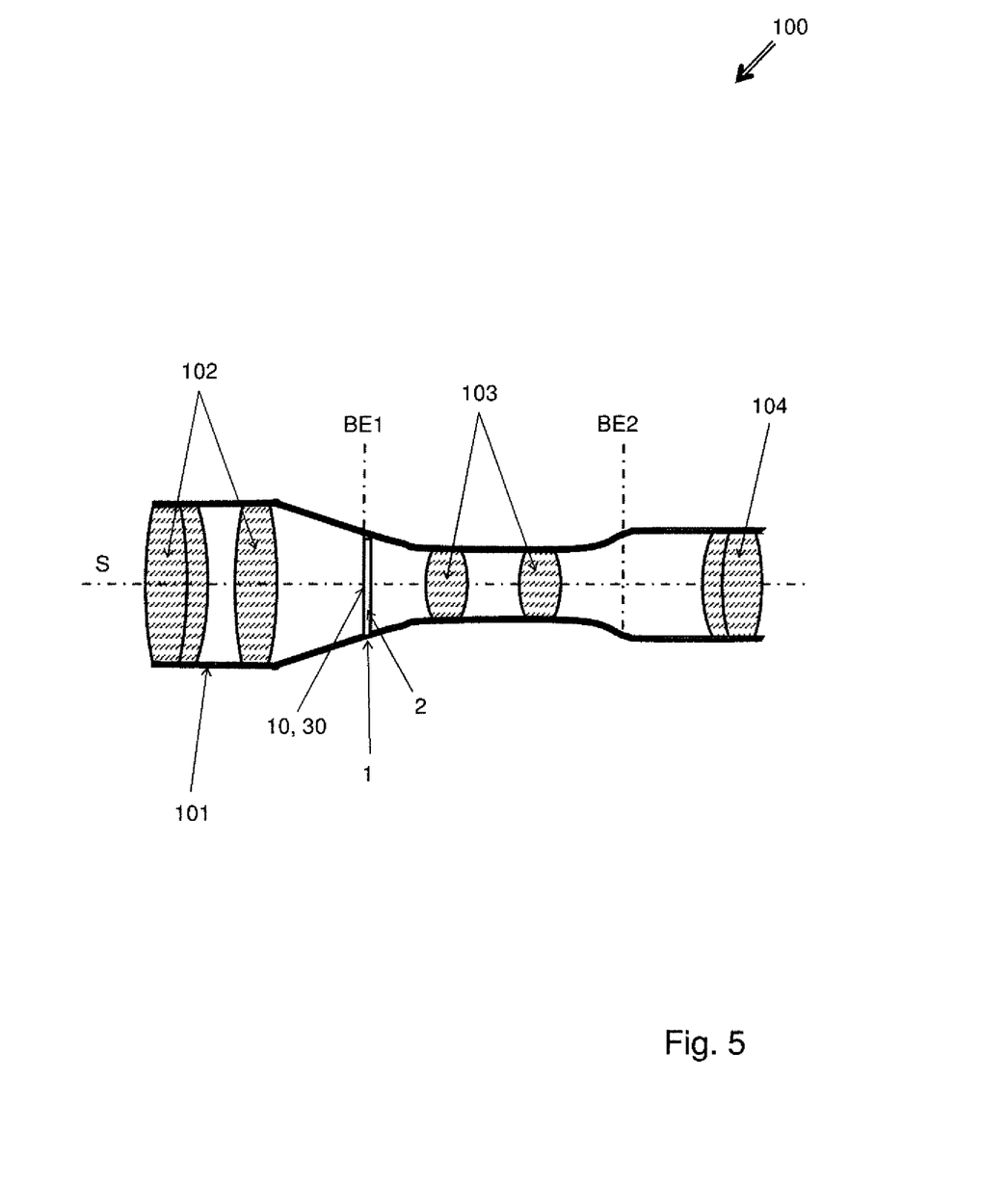
FIG. 5 is a schematic illustration of a longitudinal section through a telescopic sight having a reticle as per FIG. 1.

FIG. 5 is a schematic illustration of a longitudinal section through a telescopic sight 100 having a reticle 1 with the features of FIGS. 1, 2, 3 and 4. The telescopic sight 100 has a tubular housing 101 in which an objective 102 is arranged at the side of the target object along an optical beam path S. Behind the objective along the beam path, there is a first image plane BE1. The reticle 1 is positioned in said first image plane. In particular, that side of the carrier plate 2 on which the graphical depictions of the reticle 1 are situated, in particular the sighting aid 30, the zoom factors and the size value scale 10, lies in the first image plane BE1. No further image planes exist in the telescopic sight 100 in the direction of the target object.

A lens arrangement 103 is accommodated in the housing 101 behind the reticle 1 along the beam path S. Said lens arrangement inverts the image present in the first image plane BE1 and focuses it on an enlarged scale in a second image plane BE2 behind the lens arrangement 103. The reticle 1 and the target object are thus magnified. The telescopic sight 100 has, in particular, an adjustable optical magnification or an optical zoom. For this purpose, the lens arrangement 103 is formed as an inverting system which has two lens units which are mounted so as to be Individually displaceable along the beam path S between the first and second image planes BE1, BE2. The individual displacements of the two lens units are kinematically coupled such that a position of one of the lens units is dependent on the position of the other of the lens units.

On that side of the housing 101 which faces toward the shooter, an ocular 104 is arranged in said housing for the purposes of viewing the image in the second image plane BE2.

Not Illustrated is a holder for attachment in a fixed predetermined position relative to a barrel of a firearm.

Finally, such a firearm with telescopic sight 100 can be used to carry out a method for striking a target object ZO of known or estimable size with a projectile fired from the firearm, which method comprises the following steps:

localizing the target object ZO of known or estimable actual size X, Y;

determining the distance to the target object ZO by positioning the size value scale 10 on the target object ZO, in particular at reference points E1, E2, E3, E4 of the target object ZO, reading the numerical value W from the size value scale 10 and converting the numerical value W into the distance;

adjusting the telescopic sight 100 on the basis of the determined distance;

aligning the target point 33 on the target object ZO; and firing the projectile from the firearm.

The adjustment of the telescopic sight 100 may be performed in particular taking into consideration side wind and/or vertical air streams and relevant parameters of the firearm used and/or of the munition used, which can all have a significant influence on the trajectory of the projectile.

The invention is not restricted to one of the embodiments described above, but rather may be modified in a wide variety of ways.

All of the features and advantages that emerge from the claims, from the description and from the drawing, including structural details, spatial arrangements and method steps, may be essential to the invention both individually and in a wide variety of combinations.

| List of reference signs | |
|---|---|
| 1 | Reticle |
| 2 | Carrier plate |
| 3 | Edge |
| 10 | Size value scale |
| 11 | First principal line |
| 12 | Second principal line |
| 13 | Read line |
| 14 | Read point |
| 20 | Zoom factor |
| 30 | Sighting aid |
| 31 | Horizontal sighting axis |
| 32 | Vertical sighting axis |
| 33 | Target point |
| 34 | Double line |
| 35 | Raster |
| 36 | Second raster |
| 37 | Mark elongation |
| 38 | Interrupted line |
| 39 | Line section |
| 100 | Telescopic sight |
| 101 | Housing |
| 102 | Objective |
| 103 | Lens arrangement |
| 104 | Ocular |
| BE1 | First image plane |
| BE2 | Second image plane |
| D | Distance |
| D1 | Defined first distance |
| D2 | Defined second distance |
| E1 | First reference point (target object) |
| E2 | Second reference point (target object) |
| E3 | Third reference point (target object) |
| E4 | Fourth reference point (target object) |
| F1 | First conversion formula |

-continued

| List of reference signs | |
|---|---|
| F2 | Second conversion formula |
| F3 | MIL distance formula |
| F4 | MIL target object size formula |
| Q1 | First quadrant |
| Q2 | Second quadrant |
| Q3 | Third quadrant |
| Q4 | Fourth quadrant |
| S | Optical beam path |
| W | Numerical value |
| X | Size (target object) |
| Y | Size (target object) |
| ZO | Target object |

The invention claimed is:

1. A reticle (1) for a telescopic sight (100), having a transparent carrier plate (2) on which a size value scale (10) is depicted, wherein the size value scale (10) has a first principal line (11), which forms a first positioning line for positioning at a first reference point (E1) of a target object (ZO), read lines (13) for positioning at a second reference point (E2) of the target object (ZO) being arranged parallel to the first principal line (11), the read lines (13) being assigned in each case one numerical value (W), wherein
the distance between two adjacently arranged read lines (13) which are each assigned a natural numerical value (W) increases with increasing distance from the first principal line (11), and
the first principal line (11) is assigned a first conversion formula (F1), into which the ascertained numerical value (W) read at the second reference point (E2) of the target object (ZO) is intended to be inserted as input variable.

2. The reticle (1) as claimed in claim 1, wherein a distance (D) of the reticle (1) from the target object (ZO) is calculable by means of the first conversion formula (F1) in that the ascertained numerical value (W) is intended to be multiplied by a defined first distance (D1) and by a known size (X) of the target object (ZO) between the first and second reference points (E1, E2).

3. The reticle (1) as claimed in claim 2, wherein the defined first distance (D1) is 100 m and the known size (X) should be inserted in meters.

4. The reticle (1) as claimed in claim 1, wherein the numerical values (W) are depicted on at least two of the read lines (13).

5. A telescopic sight (100) having a housing (101) in which an objective (102) and a reticle (1) as claimed in claim 1 are arranged along an optical beam path (5).

6. The telescopic sight (100) as claimed in claim 5, wherein said telescopic sight has a first image plane (BE1) behind the objective (102) along the beam path (S), the reticle (1) being arranged in the first image plane (BE1).

7. A firearm having a telescopic sight (100) as claimed in claim 5.

8. A method for striking a target object (ZO) of known or estimable size with a projectile fired from a firearm as claimed in claim 7, comprising the following steps:
localizing the target object (ZO) of known or estimable actual size (X, Y);
determining the distance to the target object (ZO) by positioning the size value scale (10) on the target object (ZO), reading the numerical value (W) from the size value scale (10) and converting the numerical value (W) into the distance;
adjusting the telescopic sight (100) on the basis of the determined distance;
aligning the target point (33) on the target object (ZO);
firing the projectile from the firearm.

9. A reticle (1) for a telescopic sight (100), having a transparent carrier plate (2) on which a size value scale (10) is depicted, wherein the size value scale (10) has a first principal line (11), which forms a first positioning line for positioning at a first reference point (E1) of a target object (ZO), read lines (13) for positioning at a second reference point (E2) of the target object (ZO) being arranged parallel to the first principal line (11), the read lines (13) being assigned in each case one numerical value (W),
wherein the distance between two adjacently arranged read lines (13) which are each assigned a natural numerical value (W) increases with increasing distance from the first principal line (11) and the size value scale (10) has a second principal line (12) which is oriented perpendicular to the first principal line (11), wherein the read lines (13) are arranged along the second principal line (12), the second principal line (12) forming a second positioning line for positioning at a third reference point (E3) of the target object (ZO), and the read lines (13) extending away from the second principal line (12), and the respective free end of the read lines (13) forming a read point (14) for positioning at a fourth reference point (E4) of the target object (ZO).

10. The reticle (1) as claimed in claim 9, wherein the distance between the second principal line (12) and the read point (14) of a read line (13) increases with increasing distance of the read line (13) from the first principal line (11).

11. The reticle (1) as claimed in claim 9, wherein all read points (14) of the read lines (13) which extend away from the second principal line (12) in the same direction are arranged on a straight line.

12. The reticle (1) as claimed in claim 9, wherein the second principal line (12) is assigned a second conversion formula (F2) into which the ascertained numerical value (W) read at the fourth reference point (E4) of the target object (ZO) is intended to be inserted as input variable.

13. The reticle (1) as claimed in claim 12, wherein a distance (D) of the reticle (1) from the target object (ZO) is calculable by means of the second conversion formula (F2) in that the ascertained numerical value (W) is intended to be multiplied by a defined second distance (D2) and by a known size (Y) of the target object (ZO) between the third and fourth reference points (E3, E4).

14. The reticle (1) as claimed in claim 13, wherein the defined second distance (D2) is 200 m and the known size (Y) should be inserted in meters.

15. The reticle (1) as claimed in claim 9, wherein, at least in one case, the middle read line (13) of three adjacent read lines (13) extends away from the second principal line (12) in the opposite direction to the two outer read lines of the three adjacent read lines (13).

16. The reticle (1) as claimed in claim 9, wherein those read lines (13) which are arranged relatively close to the first principal line (11) extend away from the second principal line (12) alternately in opposite directions.

17. The reticle (1) as claimed in claim 9, wherein those read lines (13) which are arranged further remote from the first principal line (11) extend away from the second principal line (12) in the same direction.

18. The reticle (1) as claimed in claim 9, wherein the distance between the second principal line (12) and the respective read point (14) of one of the read lines (13) is assigned the same numerical value (W) as the distance between the first principal line (11) and said read line (13).

19. The reticle (1) as claimed in claim 9, wherein the first principal line (11) is oriented horizontally and the second principal line (12) is oriented vertically.

20. A reticle (1) for a telescopic sight (100), having a transparent carrier plate (2) on which a size value scale (10) is depicted, wherein the size value scale (10) has a first principal line (11), which forms a first positioning line for positioning at a first reference point E1 of a tar et object (ZO), read lines (13) for positioning at a second reference point (E2) of the target object (ZO) being arranged parallel to the first principal line (11), the read lines (13) being assigned in each case one numerical value (W),
- wherein the distance between two adjacently arranged read lines (13) which are each assigned a natural numerical value (W) increases with increasing distance from the first principal line (11),
- the size value scale (10) is arranged in one of the four quadrants (Q1, Q2, Q3, Q4) of the sighting aid (30), and
- the size value scale (10) is situated entirely in a region around the target point (33), which region extends vertically from 0 MIL to ±10 MIL and horizontally from 0 MIL to ±10 MIL of an optionally depicted MIL scale.

21. The reticle (1) as claimed in claim 20, wherein the size value scale (10) is arranged in that quadrant (Q3) of the sighting aid (30) which is arranged to the left of the vertical sighting axis (32) and below the horizontal sighting axis (31).

* * * * *